(12) United States Patent
Ye et al.

(10) Patent No.: US 10,097,109 B1
(45) Date of Patent: Oct. 9, 2018

(54) THREE-LEVEL VOLTAGE BUS APPARATUS AND METHOD

(71) Applicant: FutureWei Technologies, Inc., Plano, TX (US)

(72) Inventors: Liming Ye, Frisco, TX (US); Heping Dai, Plano, TX (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/653,854

(22) Filed: Jul. 19, 2017

(51) Int. Cl.
*H02M 7/5387* (2007.01)
*H02M 3/335* (2006.01)
*H02M 7/483* (2007.01)
*H02M 1/088* (2006.01)
*H02M 3/28* (2006.01)

(52) U.S. Cl.
CPC ....... *H02M 7/53871* (2013.01); *H02M 1/088* (2013.01); *H02M 3/285* (2013.01); *H02M 3/33569* (2013.01); *H02M 7/483* (2013.01)

(58) Field of Classification Search
CPC ............... H02M 7/483; H02M 7/5387; H02M 7/53871; H02M 1/088; H02M 3/33569
See application file for complete search history.

(56) References Cited

U.S. PATENT DOCUMENTS

| | | | | |
|---|---|---|---|---|
| 4,203,151 A * | 5/1980 | Baker | ................... | H02M 7/487 363/132 |
| 8,149,599 B2 * | 4/2012 | Coccia | ................ | H02M 3/3376 363/21.02 |
| 2006/0221653 A1 * | 10/2006 | Lai | ......... | H02M 5/225 363/37 |
| 2007/0159749 A1 * | 7/2007 | Oka | ....... | H02M 7/487 361/93.1 |
| 2009/0201706 A1 * | 8/2009 | Zacharias | ............... | H02M 7/48 363/123 |
| 2009/0207639 A1 * | 8/2009 | Tanaka | .................. | H02M 7/003 363/141 |
| 2010/0246231 A1 * | 9/2010 | Sirio | .................... | H02M 3/1588 363/132 |
| 2012/0161858 A1 * | 6/2012 | Permuy | ................. | H02J 7/0014 327/536 |
| 2012/0218785 A1 * | 8/2012 | Li | ............................ | H02M 1/34 363/21.12 |
| 2013/0033786 A1 * | 2/2013 | Mao | ......................... | H02M 1/32 361/18 |
| 2013/0094260 A1 * | 4/2013 | Martini | .................. | H02M 7/483 363/97 |
| 2013/0107599 A1 * | 5/2013 | Shekhawat | ........... | H02M 7/487 363/131 |
| 2013/0155747 A1 * | 6/2013 | Wang | ..................... | H02M 7/487 363/132 |
| 2013/0176762 A1 * | 7/2013 | Seymour | ........... | H02M 7/53871 363/132 |
| 2013/0272045 A1 * | 10/2013 | Soeiro | ................... | H02M 7/537 363/131 |

(Continued)

*Primary Examiner* — Jason M Crawford
(74) *Attorney, Agent, or Firm* — Slater Matsil, LLP

(57) ABSTRACT

An apparatus includes a first switch and a first capacitor connected in series between a first voltage bus and a second voltage bus, a second capacitor and a second switch connected in series between the first voltage bus and the second voltage bus and a diode coupled between a common node of the first switch and the first capacitor, and a common node of the second capacitor and the second switch.

20 Claims, 3 Drawing Sheets

(56) References Cited

U.S. PATENT DOCUMENTS

| | | | |
|---|---|---|---|
| 2013/0301314 A1* | 11/2013 | Fu ......................... | H02M 7/487 |
| | | | 363/37 |
| 2014/0003093 A1* | 1/2014 | Song .................... | H02M 7/483 |
| | | | 363/13 |
| 2014/0185346 A1* | 7/2014 | Liu ...................... | H03K 17/127 |
| | | | 363/131 |
| 2014/0254208 A1* | 9/2014 | Dai ....................... | H02M 3/335 |
| | | | 363/21.02 |
| 2014/0319919 A1* | 10/2014 | Fu ......................... | H02M 7/539 |
| | | | 307/82 |
| 2015/0028794 A1* | 1/2015 | Flett ..................... | H02M 7/537 |
| | | | 320/101 |
| 2015/0244284 A1* | 8/2015 | Fu ......................... | H02M 7/537 |
| | | | 363/41 |
| 2016/0181920 A1* | 6/2016 | Dai ........................ | H02M 1/14 |
| | | | 323/271 |
| 2016/0191046 A1* | 6/2016 | Zhao .................... | H03K 17/127 |
| | | | 327/432 |
| 2017/0005592 A1* | 1/2017 | Yan .................... | H02M 7/53871 |
| 2017/0201189 A1* | 7/2017 | Li ....................... | H02M 7/5395 |

\* cited by examiner

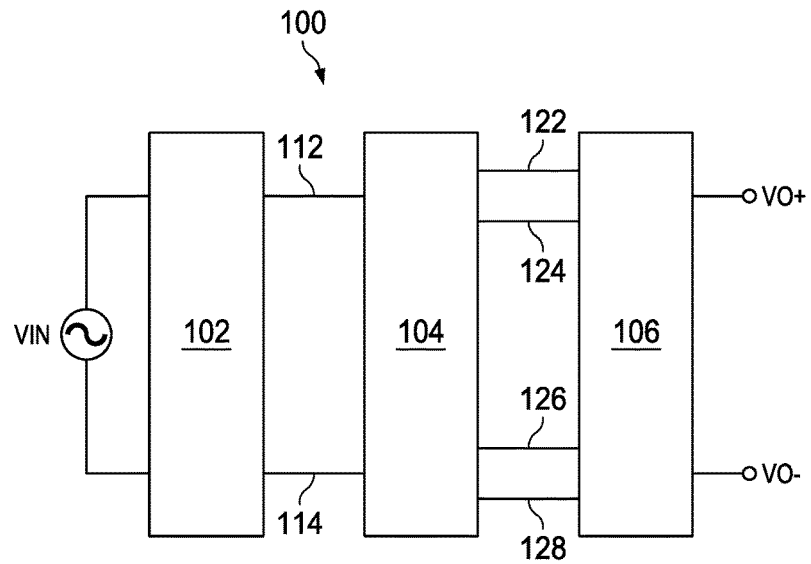
FIG. 1
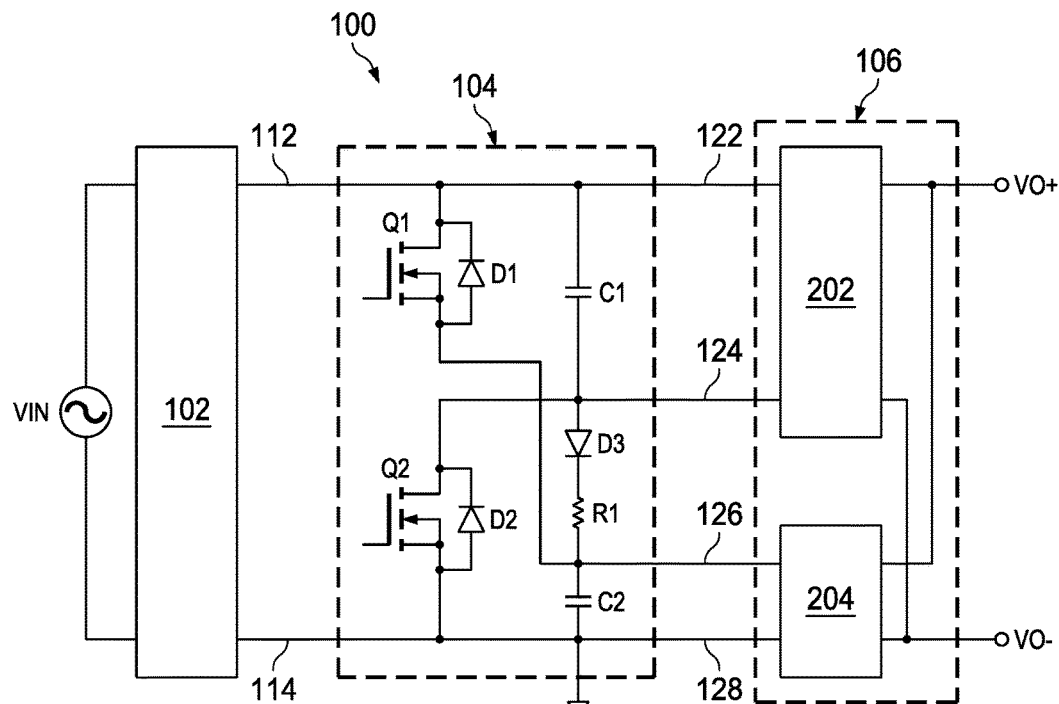
FIG. 2
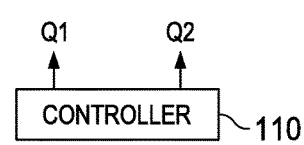

THREE-LEVEL VOLTAGE BUS APPARATUS AND METHOD

TECHNICAL FIELD

The present disclosure relates to a voltage bus in a power system, and more particularly, to a three-level voltage bus coupled between a front-end stage and two downstream power converters.

BACKGROUND

A power supply system (e.g., an adaptor) is used to convert the alternating current (ac) voltage from the utility companies into a direct current (dc) voltage suitable for electronic devices. In many applications, the power supply system is required to operate with a wide input voltage range. For example, in China and many European countries, the ac supply voltage from the utility companies is in a range from about 210 V to about 240 V and has a frequency of about 50 Hz. The voltage above is an RMS voltage. RMS stands for Root Mean Square. In North America, the ac supply voltage is in a range from about 100 V to about 120 V and has a frequency of about 60 Hz. Electronic devices such as a laptop computer may need a universal adapter so that the laptop computer can work in different countries.

The power supply system (e.g., an adaptor) usually includes an ac/dc stage (e.g., a rectifier) and an isolated dc/dc stage (e.g., an isolated dc/dc converter). The ac/dc stage converts the power from the ac utility line and establishes a dc bus for the isolated dc/dc stage. The ac/dc stage may comprise a variety of electromagnetic interference (EMI) filters and a bridge rectifier formed by four diodes. The EMI filters are employed to attenuate both differential mode noise and common mode noise. The bridge rectifier converts the ac voltage into a full-wave rectified dc voltage. Such a full-wave rectified dc voltage provides a steady dc input voltage for the isolated dc/dc stage through a plurality of smoothing capacitors coupled to the output of the bridge rectifier.

The isolated dc/dc stage converts the voltage of the dc bus to a voltage suitable to electronics loads such as tablets, printers, mobile phones, personal computers, any combinations thereof and the like. The isolated dc/dc stage can be implemented by using different power topologies, such as flyback converters, forward converters, half bridge converters, full bridge converters and the like.

SUMMARY

These and other problems are generally solved or circumvented, and technical advantages are generally achieved, by preferred embodiments of the present disclosure which provide a three-level voltage bus configuring inputs of two downstream converters either in series or in parallel.

In accordance with an embodiment, an apparatus comprises a first switch and a first capacitor connected in series between a first voltage bus and a second voltage bus, a second capacitor and a second switch connected in series between the first voltage bus and the second voltage bus and a diode coupled between a common node of the first switch and the first capacitor, and a common node of the second capacitor and the second switch.

In accordance with another embodiment, a method comprises detecting a voltage across a first voltage bus and a second voltage bus of a three-level voltage bus apparatus, turning off a first switch and a second switch of the three-level voltage bus apparatus when the voltage across the first voltage bus and the second voltage bus of the three-level voltage bus apparatus is greater than a first voltage threshold and turning on the first switch and the second switch of the three-level voltage bus apparatus when the voltage across the first voltage bus and the second voltage bus of the three-level voltage bus apparatus is less than a second voltage threshold, wherein the first voltage threshold is greater than the second voltage threshold.

In accordance with yet another embodiment, a system comprises a three-level voltage bus apparatus configured to be connected with a power source, wherein the three-level voltage bus apparatus comprises a first switch and a first capacitor connected in series between a first voltage bus and a second voltage bus, a second capacitor and a second switch connected in series between the first voltage bus and the second voltage bus and a diode coupled between a common node of the first switch and the first capacitor, and a common node of the second capacitor and the second switch, a first power converter having inputs connected to the first capacitor and a second power converter having inputs connected to the second capacitor, wherein outputs of the first power converter and outputs of the second power converter are connected in parallel.

An advantage of an embodiment of the present disclosure is a three-level voltage bus configuring inputs of two downstream converters either in series or in parallel so as to reduce the voltage variation range applied to the downstream converters.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which:

FIG. 1 illustrates a block diagram of a power system in accordance with various embodiments of the present disclosure;

FIG. 2 illustrates a schematic diagram of the three-level voltage bus apparatus shown in FIG. 1 in accordance with various embodiments of the present disclosure;

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

Figure 3:
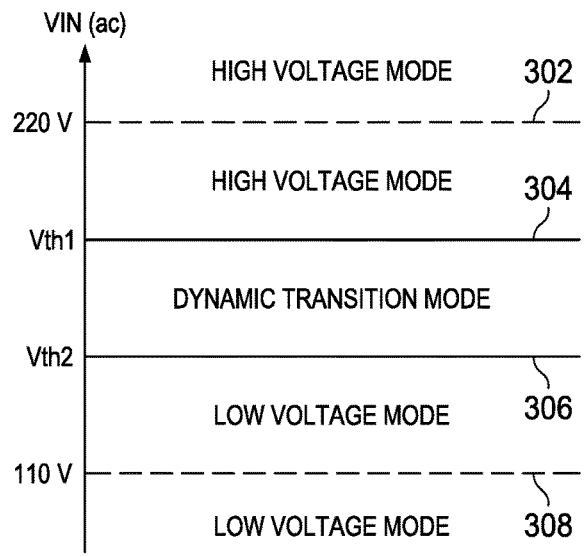
FIG. 3 illustrates three operation modes of the three-level voltage bus apparatus shown in FIG. 1 in accordance with various embodiments of the present disclosure.

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure.

The present disclosure will be described with respect to preferred embodiments in a specific context, namely a three-level voltage bus apparatus in an ac/dc power system. The disclosure may also be applied, however, to a variety of power applications. Hereinafter, various embodiments will be explained in detail with reference to the accompanying drawings.

FIG. 1 illustrates a block diagram of a power system in accordance with various embodiments of the present disclosure. The power system 100 is coupled between an input ac source VIN and a load (not shown). As shown in FIG. 1, the power system 100 includes a front-end stage 102, a three-level voltage bus apparatus 104 and a power conversion stage 106. The front-end stage 102, the three-level voltage bus apparatus 104 and the power conversion stage 106 are connected in cascade between the input ac source and the load.

In some embodiments, the front-end stage 102 comprises an electromagnetic interference (EMI) filter and a rectifier connected in cascade. The EMI filter is employed to reduce high frequency noise that may cause interference with other devices of the power system 100. As a result of employing the EMI filters, the power system 100 may meet various EMI regulations. The rectifier is employed to convert alternating current to direct current. There may be a plurality of smoothing capacitors at the output of the rectifier to smooth the voltage and produce a steady and smooth output voltage.

The EMI filter may comprise a plurality of passive components including capacitors and inductors. The inductors allow dc or low frequency currents to pass through, while blocking the unwanted high frequency currents. The capacitors provide low impedance paths to divert the unwanted high frequency currents or noise from the EMI filter. The unwanted high frequency currents either go back into the input power source or into ground.

In some embodiments, the EMI filter is designed to attenuate both differential mode noise and common mode noise. The EMI filter may comprise two differential-mode inductors, two common-mode inductors and a plurality of filter capacitors. The two differential-mode inductors along with the plurality of filter capacitors are implemented to filter out differential-mode noise within the power system 100. The two common-mode inductors are utilized to filter out common-mode noise within the power system 100. In some embodiments, the two common-mode inductors are coupled inductors.

In some embodiments, the rectifier is a full wave bridge rectifier. The rectifier comprises four rectifying diodes connected in a closed loop bridge configuration. The four diodes are arranged in series pairs with only two diodes conducting current during each half cycle. During a positive half cycle of the input ac power source, a first diode and a second diode conduct in series while a third diode and a fourth diode are reverse biased and the current flows through the load through the first diode and the second diode. During a negative half cycle of the input ac power source, the third diode and the fourth diode conduct in series while the first diode and the second diode are reverse biased and the current flows through the load through the third diode and the fourth diode.

The three-level voltage bus apparatus 104 comprises two switches, two capacitors and a diode. The three-level voltage bus apparatus 104 is employed to reconfigure the voltage applied to the three-level voltage bus apparatus 104. More particularly, when the voltage across the input of the three-level voltage bus apparatus 104 is greater than a first voltage threshold, both switches of the three-level voltage bus apparatus 104 are turned off. The two capacitors of the three-level voltage bus apparatus 104 are connected in series and the voltage is applied to the series-connected capacitors evenly, assuming that the two capacitors have the same capacitance. The two capacitors provide two voltage buses for the downstream converters of the power conversion stage 106. The voltage of each voltage bus is approximately equal to one half of the voltage applied to the three-level voltage bus apparatus 104.

On the other hand, when the voltage across the input of the three-level voltage bus apparatus 104 is less than a second voltage threshold, which is less than the first voltage threshold, both switches of the three-level voltage bus apparatus 104 are turned on. The turned on switches reconfigure the voltage applied to the three-level voltage bus apparatus 104. In particular, the voltage applied to the three-level voltage bus apparatus 104 is applied to the two capacitors, respectively. As a result, the voltage across each capacitor of the three-level voltage bus apparatus 104 is approximately equal to the voltage applied to the three-level voltage bus apparatus 104. The detailed structure of the three-level voltage bus apparatus 104 will be described below with respect to FIG. 2.

The power conversion stage 106 comprises two power converters. In some embodiments, the two power converters are implemented as isolated dc/dc converters. Throughout the description, these two power converters are alternatively referred to as two downstream power converters.

The inputs of the first power converter are connected to the first capacitor of the three-level voltage bus apparatus 104. The inputs of the second power converter are connected to the second capacitor of the three-level voltage bus apparatus 104. The outputs of the first power converter and the outputs of the second power converter are connected in parallel. The detailed structure of the power conversion stage 106 will be described below with respect to FIG. 2.

FIG. 2 illustrates a schematic diagram of the three-level voltage bus apparatus shown in FIG. 1 in accordance with various embodiments of the present disclosure. The three-level voltage bus apparatus 104 comprises a first switch Q1, a second switch Q2, a first capacitor C1, a second capacitor C2, a diode D3 and a thermistor R1. As shown in FIG. 2, the outputs of the front-end stage 102 include two voltage buses, namely a first voltage bus 112 and a second voltage bus 114. The voltage of the first voltage bus 112 is higher than the voltage of the second voltage bus 114. In some embodiments, the second voltage bus 114 is connected to ground as shown in FIG. 2.

As shown in FIG. 2, the first capacitor C1, the diode D3, the thermistor R1 and the second capacitor C2 are connected in series between the first voltage bus 112 and the second voltage bus 114. The first switch Q1 is connected between the first voltage bus 112 and the common node of the second capacitor C2 and the thermistor R1. In particular, the drain of the first switch Q1 is connected to the first voltage bus 112 and the source of the first switch Q1 is connected to the common node of the second capacitor C2 and the thermistor R1.

The second switch Q2 is connected between the second voltage bus 114 and the common node of the first capacitor C1 and the diode D3. In particular, the drain of the second switch Q2 is connected to the common node of the first capacitor C1 and the diode D3. The source of the second switch Q2 is connected to the second voltage bus 114. Both the gate of the first switch Q1 and the gate of the second switch Q2 are controlled by a controller 110 as shown in FIG. 2.

The controller 110 may detect the voltage across the outputs of the front-end stage 102. Based upon the detected voltage, the controller 110 generates gate drive signals to control the on/off of the first switch Q1 and the second switch Q2. The detailed operation principle of the controller 110 will be described below with respect to FIG. 6.

It should be noted detecting the voltage across the outputs of the front-end stage 102 is merely an example. A person skilled in the art will recognize that there may be a variety of alternatives for implementing this function. For example, the controller 110 may detect the voltage of the input ac power source VIN directly and use the detected VIN voltage to determine the on/off of the first switch Q1 and the second switch Q2.

It should further be noted that while FIG. 2 shows a controller is employed to generate the gate signals for the power system 100, a person skilled in the art will recognize that there may be a variety of alternatives for implementing the function of the controller 110. For example, the controller 110 may be replaced by discrete components. Furthermore, there may be one dedicated driver or multiple dedicated drivers coupled between the controller 110 and the switches Q1 and Q2.

In sum, the power system 100 and the controller 110 illustrated herein is limited solely for the purpose of clearly illustrating the inventive aspects of the various embodiments. The present invention is not limited to any particular power topology.

The switches (e.g., first switch Q1) shown in FIG. 2 may be implemented as metal oxide semiconductor field effect transistor (MOSFET) devices. Alternatively, the switches may be implemented as other suitable controllable devices such as n-type metal oxide semiconductor (NMOS) transistors, bipolar junction transistor (BJT) devices, super junction transistor (SJT) devices, insulated gate bipolar transistor (IGBT) devices, gallium nitride (GaN) based power devices and/or the like.

It should further be noted that while FIG. 1 illustrates two switches Q1 and Q2, various embodiments of the present disclosure may include other variations, modifications and alternatives. For example, each switch may be replaced by a plurality of switches connected in parallel.

The voltage of the input ac source VIN is in a range from about 100 V to about 240 V (RMS voltage). In some embodiments, the input ac source VIN has a voltage of about 220 V and a frequency of about 50 Hz. In alternative embodiments, the input ac source VIN has a voltage of about 110 V and a frequency of about 60 Hz.

In some embodiments, when the input ac source VIN has a voltage of 220 V (RMS voltage), the voltage applied to the three-level voltage bus apparatus 104 is about 312 V (dc voltage). On the other hand, when the input ac source has a voltage of 110 V (RMS voltage), the voltage applied to the three-level voltage bus apparatus 104 is about 156 V (dc voltage). By employing the voltage bus reconfiguration technique described above with respect to FIGS. 1-2, the voltage stresses on the first switch Q1 and the second switch Q2 can be reduced accordingly.

In operation, when the input ac source VIN has a voltage of 220 V and the voltage applied the three-level voltage bus apparatus 104 is about 312 V, the power system 100 enters a high voltage mode. In response to the high voltage mode, both the first switch Q1 and the second switch Q2 are turned off. Since the first capacitor C1 and the second capacitor C2 are connected in series, the voltage across each capacitor is about 156 V. Likewise, the voltage across each switch is about 156 V.

In operation, when the input ac source VIN has a voltage of 110 V and the voltage applied the three-level voltage bus apparatus 104 is about 156 V, the power system 100 enters into a low voltage mode. In response to the low voltage mode, both the first switch Q1 and the second switch Q2 are turned on. Since both first switch Q1 and the second switch Q2 are turned on, both the first capacitor C1 and the second capacitor C2 are connected to the outputs of the front-end stage 102. The voltage across each capacitor is about 156 V.

In operation, the power system 100 may enter a dynamic transition mode when the input ac source VIN has a voltage in a range between 110 V and 220 V. The detailed operation principle of the dynamic transition mode will be described below with respect to FIG. 3.

During the operation modes described above, the voltage across each capacitor is less than 200 V. As such, capacitors C1 and C2 can be implemented as capacitors having a voltage rating of 200 V. Likewise, the switches Q1 and Q2 can be implemented as MOSFETs having a voltage rating of 200 V.

The diode D3 is employed to prevent a short circuit between the first voltage bus 112 and the second voltage bus 114. In particular, when both switches Q1 and Q2 are turned on, the reverse biased diode D3 can prevent a short circuit between the first voltage bus 112 and the second voltage bus 114.

The thermistor R1 functions as an inrush current limiter. In some embodiments, the thermistor R1 is implemented as a negative temperature coefficient (NTC) device.

The power conversion stage 106 comprises a first power converter 202 and a second power converter 204. As shown in FIG. 2, the first power converter 202 has two inputs, namely a first input 122 and a second input 124. As shown in FIG. 2, both the first input 122 and the second input 124 are connected to the two terminals of the first capacitor C1, respectively. Furthermore, the first input 122 is connected to the first bus 112.

The second power converter 204 has two inputs, namely a first input 126 and a second input 128. As shown in FIG. 2, both the first input 126 and the second input 128 are connected to the two terminals of the second capacitor C2, respectively. Furthermore, the second input 128 is connected to the second bus 114.

The outputs of the first power converter 202 and the outputs of the second power converter 204 are connected in parallel to provide a first output terminal VO+ (a first output voltage port) and a second output terminal VO− (a second output voltage port). The output terminals of the power system 100 may be connected to a load or a downstream power converter.

In some embodiments, the first power converter 202 and the second power converter 204 are isolated dc/dc converters including full-bridge dc/dc converters, half-bridge dc/dc converters, forward dc/dc converters, flyback dc/dc converters, inductor-inductor-capacitor (LLC) resonant converters and the like.

In some embodiments, the first power converter 202 and the second power converter 204 have the same control mechanism (e.g., PWM control). Furthermore, the first power converter 202 and the second power converter 204 operate at the same switching frequency. The same control mechanism and the same switching frequency help to keep the voltages on the capacitors C1 and C2 balanced. Moreover, the magnetic device (e.g., transformer and/or inductor) of the first power converter 202 may be magnetically coupled to the magnetic device (e.g., transformer and/or inductor) of the second power converter 204. For example, the transformer of the first power converter 202 and the transformer of the second power converter 204 may be magnetically coupled to each other through sharing a same magnetic core.

In alternative embodiments, the first power converter 202 is implemented as an isolated dc/dc converter. The second power converter 204 is implemented as a non-isolated dc/dc converter. For example, the first power converter 202 is implemented as a full bridge converter. The second power converter 204 is implemented as a buck converter.

One advantageous feature of having the three-level voltage bus apparatus 104 shown in FIG. 2 is the reconfiguration of the voltage bus depending on different input voltages helps to reduce the inrush current of the power system 100 during a startup of the power system 100. Furthermore, the reconfiguration of the voltage bus can reduce the capacitor volume at the voltage buses 112 and 114.

In some embodiments, the capacitor volume may be reduced by 50% in comparison with a conventional voltage bus. For example, in a conventional power system, the capacitor at the voltage bus between a rectifier and a downstream power converter is a capacitor of 68 uF with a 400 V voltage rating. The diameter of this capacitor is about 18 mm and the height of the capacitor is about 25 mm. In contrast, the capacitors shown in FIG. 2 can be a capacitor of 56 uF with a 200 V voltage rating. The diameter of this capacitor is about 10 mm and the height of the capacitor is about 25 mm, resulting in about 40% reduction in the total capacitor volume.

Furthermore, the reduced voltage between the first bus 112 and the second bus 114 helps to reduce the voltage stress on the switches of the downstream power converters 202 and 204. The reduced voltage stress on the switches of the downstream power converters helps to improve the system efficiency. The improved system efficiency can help the power system 100 achieve higher power density.

FIG. 3 illustrates three operation modes of the three-level voltage bus apparatus shown in FIG. 1 in accordance with various embodiments of the present disclosure. The voltage of the input ac source VIN is in a range from about 100 V to about 240 V (RMS voltage). In some embodiments, the input ac source VIN has a voltage of about 220 V as indicated by the dashed line 302. In alternative embodiments, the input ac source VIN has a voltage of about 110 V as indicated by the dashed line 308.

In order to reconfigure the three-level voltage bus apparatus 104, two voltage thresholds are employed to determine the on/off the first switch Q1 and the second switch Q2. As shown in FIG. 3, a first voltage threshold Vth1 and a second voltage threshold Vth2 are between 110 V and 220 V. The first voltage threshold Vth1 is greater than the second voltage threshold Vth2 as indicated by dashed lines 304 and 306.

In some embodiments, when the voltage from the input ac source VIN is greater than the first voltage threshold Vth1, the three-level voltage bus apparatus 104 enters into a high voltage mode. In the high voltage mode, both the first switch Q1 and the second switch Q2 of the three-level voltage bus apparatus are turned off. In response to the turned-off switches Q1 and Q2, the first capacitor C1 and the second capacitor C2 are connected in series. The voltage across each capacitor is about one half of the voltage across the first voltage bus 112 and the second voltage bus 114. As a result, the input voltage of each downstream converter is about one half of the voltage across the first voltage bus 112 and the second voltage bus 114.

In some embodiments, when the voltage from the input ac source VIN is less than the second voltage threshold Vth2, the three-level voltage bus apparatus 104 enters into a low voltage mode. In the low voltage mode, both the first switch Q1 and the second switch Q2 of the three-level voltage bus apparatus 104 are turned on. In response to the turned-on switches Q1 and Q2, the first capacitor C1 and the second capacitor C2 are connected in parallel. The voltage across each capacitor is approximately equal to the voltage across the first voltage bus 112 and the second voltage bus 114. As a result, the input voltage of each downstream converter is approximately equal to the voltage across the first voltage bus 112 and the second voltage bus 114.

In some embodiments, when the voltage from the input ac source VIN is between the first voltage threshold Vth1 and the second voltage threshold Vth2, the three-level voltage bus apparatus 104 enters into a dynamic transition mode. In the dynamic transition mode, the three-level voltage bus apparatus 104 operates back and forth between the high voltage mode and the low voltage mode. In some embodiments, the transition frequency between the high voltage mode and the low voltage mode is about twice of the frequency of the input ac power source VIN.

Figure 4:
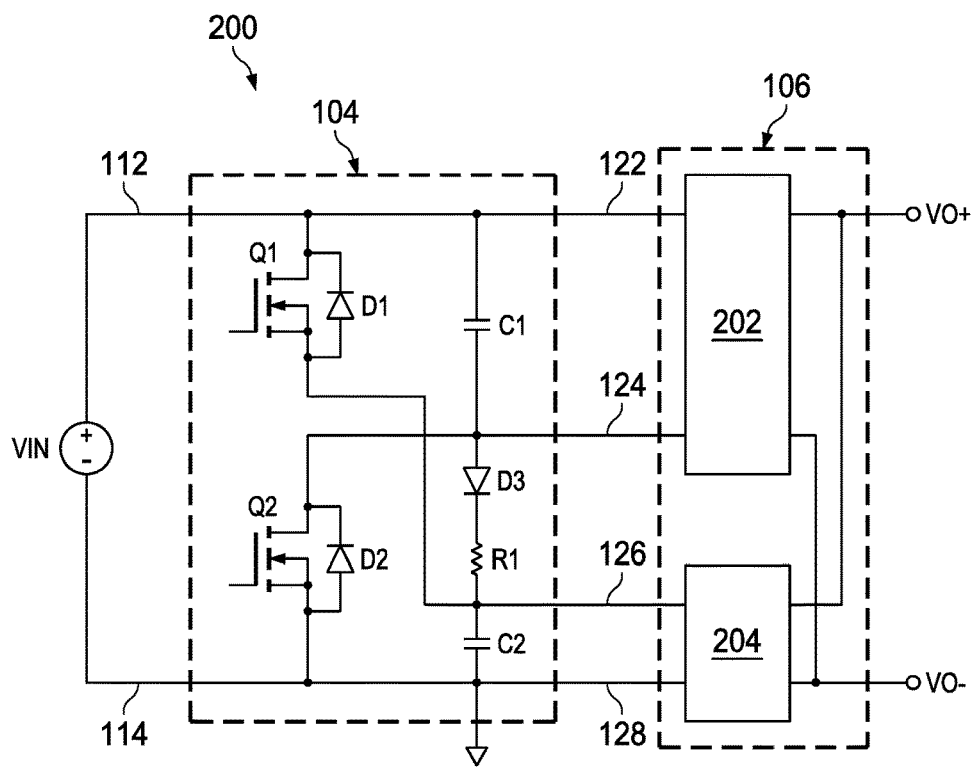
FIG. 4 illustrates another implement of the power system shown in FIG. 1 in accordance with various embodiments of the present disclosure.

FIG. 4 illustrates another implement of the power system shown in FIG. 1 in accordance with various embodiments of the present disclosure. The power system 200 shown in FIG. 4 is similar to the power system 100 shown in FIG. 2 except that the three-level voltage bus apparatus 104 is directly connected to a dc power source. The operation principle of the three-level voltage bus apparatus 104 shown in FIG. 4 is similar to that of the three-level voltage bus apparatus 104 shown in FIG. 2, and hence is not discussed in detail again to avoid unnecessary repetition.

Figure 5:
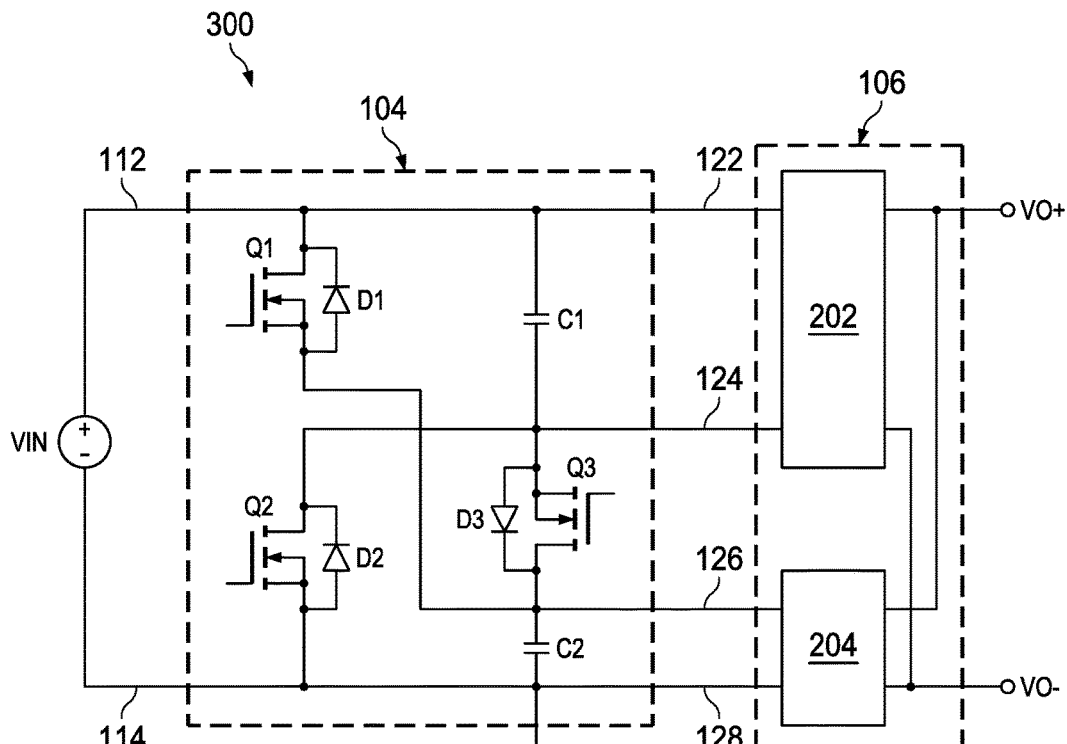
FIG. 5 illustrates yet another implement of the power system shown in FIG. 1 in accordance with various embodiments of the present disclosure.

FIG. 5 illustrates yet another implement of the power system shown in FIG. 1 in accordance with various embodiments of the present disclosure. The power system 300 shown in FIG. 5 is similar to the power system 200 shown in FIG. 4 except the diode D3 has been replaced by a switch Q3 and the thermistor R1 has been omitted. The operation principle of the three-level voltage bus apparatus 104 shown in FIG. 5 is similar to that of the three-level voltage bus apparatus 104 shown in FIG. 2, and hence is not discussed in detail again to avoid unnecessary repetition.

Figure 6:
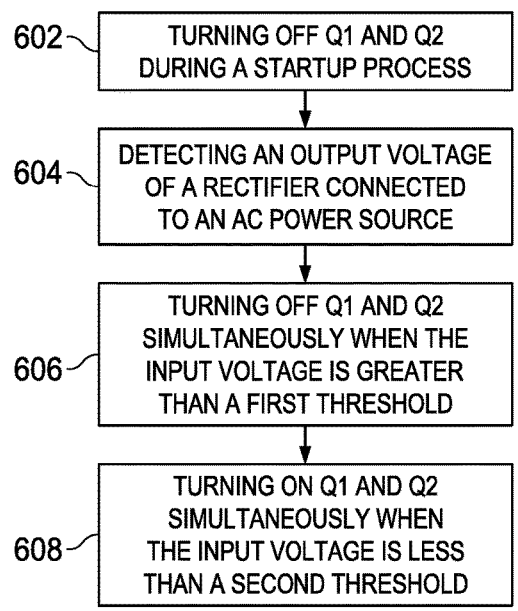
FIG. 6 illustrates a flow chart of controlling the switches shown in FIG. 2 in accordance with various embodiments of the present disclosure.

FIG. 6 illustrates a flow chart of controlling the switches shown in FIG. 2 in accordance with various embodiments of the present disclosure. This flowchart shown in FIG. 6 is merely an example, which should not unduly limit the scope of the claims. One of ordinary skill in the art would recognize many variations, alternatives, and modifications. For example, various steps illustrated in FIG. 6 may be added, removed, replaced, rearranged and repeated.

Referring back to FIG. 2, the three-level voltage bus apparatus 104 comprises two switches Q1 and Q2. The three-level voltage bus apparatus 104 is connected to an ac power source VIN through the front-end stage 102. The front-end stage 102 converts an ac voltage into a dc voltage.

In some applications, the ac power source VIN has a voltage in a range from about 210 V to about 240 V (e.g., 220 V) and has a frequency of 50 Hz. In alternative applications, the ac power source VIN has a voltage in a range from about 100 V to about 120 V (e.g., 110 V) and has a frequency of 60 Hz. When the voltage of the ac power source VIN is about 220 V (RMS voltage), the dc voltage at the inputs of three-level voltage bus apparatus 104 is about 312 V (dc voltage). On the other hand, when the voltage of the ac power source VIN is about 110 V (RMS voltage), the dc voltage at the inputs of three-level voltage bus apparatus 104 is about 156 V (dc voltage).

At step 602, during a startup process of the power system 100, both Q1 and Q2 are turned off. In some embodiments, the switches Q1 and Q2 are turned off for a predetermined period of time such as from about 10 milliseconds to about 20 milliseconds. As a result of turning off switches Q1 and Q2, the capacitors C1 and C2 are connected in series. The series-connected capacitors C1 and C2 help to reduce the inrush current of the power system 100. In some embodiments, the inrush current can be reduced by from about 50% to about 75% in comparison with that in a power system having a conventional dc voltage bus.

At step 602, after the startup process, the controller 110 shown in FIG. 2 may detect the voltage across the outputs of the front-end stage 102. The controller 110 may have two predetermined thresholds. In some embodiments, a first threshold is a predetermined value less than 312 V. A second threshold is a predetermined value greater than 156 V. In addition, the first threshold is greater than the second threshold.

It should be noted that the thresholds above are merely an example, which should not unduly limit the scope of the claims. One of ordinary skill in the art would recognize many variations, alternatives, and modifications. For example, the predetermined thresholds may vary depending on different applications and design needs.

At step 606, the first switch Q1 and the second switch Q2 of the three-level voltage bus apparatus 104 are turned off simultaneously when the voltage across the first voltage bus 112 and the second voltage bus 114 is greater than the first voltage threshold. As a result, the first capacitor C1 and the second capacitor C2 are connected in series.

At step 608, the first switch Q1 and the second switch Q2 of the three-level voltage bus apparatus 104 are turned on simultaneously when the voltage across the first voltage bus and the second voltage bus of the three-level voltage bus apparatus is less than the second voltage threshold. As a result, the first capacitor C1 and the second capacitor C2 are connected in parallel.

Although embodiments of the present disclosure and its advantages have been described in detail, it should be understood that various changes, substitutions and alterations can be made herein without departing from the spirit and scope of the disclosure as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. An apparatus comprising:
 a first switch and a first capacitor connected in series between a first voltage bus and a second voltage bus;
 a second capacitor and a second switch connected in series between the first voltage bus and the second voltage bus; and
 a diode coupled between a common node of the first switch and the first capacitor, and a common node of the second capacitor and the second switch, wherein the diode is coupled between the first capacitor and the second capacitor.

2. The apparatus of claim 1, further comprising:
 a Negative Temperature Coefficient (NTC) device connected in series with the diode.

3. The apparatus of claim 1, wherein:
 the first switch is a first Metal Oxide Semiconductor Field Effect Transistor (MOSFET); and
 the second switch is a second MOSFET.

4. The apparatus of claim 3, wherein:
 a drain of the first MOSFET is connected to the first voltage bus;
 a source of the first MOSFET is connected to the first capacitor;
 a drain of the second MOSFET is connected to the second capacitor; and
 a source of the second MOSFET is connected to the second voltage bus.

5. The apparatus of claim 3, wherein:
 the second capacitor, the diode and the first capacitor are connected in series between the first voltage bus and the second voltage bus, and wherein:
 an anode of the diode is connected to the second capacitor; and
 a cathode of the diode is connected to the first capacitor.

6. The apparatus of claim 1, wherein:
 the diode is implemented as a transistor operating at a diode emulation mode.

7. The apparatus of claim 1, wherein:
 the second capacitor is configured to be connected with a first power converter; and
 the first capacitor is configured to be connected with a second power converter.

8. The apparatus of claim 7, wherein:
 a first output terminal of the first power converter and a first output terminal of the second power converter are connected together to provide a first output voltage port; and
 a second output terminal of the first power converter and a second output terminal of the second power converter are connected together to provide a second output voltage port, and wherein a voltage from the first output voltage port is greater than a voltage from the second output voltage port.

9. The apparatus of claim 8, wherein:
the first power converter is a first isolated power converter; and
the second power converter is a second isolated power converter.

10. The apparatus of claim 8, wherein:
the first power converter is a first isolated power converter; and
the second power converter is a second non-isolated power converter.

11. A method comprising:
detecting a voltage across a first voltage bus and a second voltage bus of a three-level voltage bus apparatus;
turning off a first switch and a second switch of the three-level voltage bus apparatus when the voltage across the first voltage bus and the second voltage bus of the three-level voltage bus apparatus is greater than a first voltage threshold, wherein the first switch and a first capacitor are coupled in between the first voltage bus and the second voltage bus, and the second switch and a second capacitor are coupled in between the first voltage bus and the second voltage bus; and
turning on the first switch and the second switch of the three-level voltage bus apparatus when the voltage across the first voltage bus and the second voltage bus of the three-level voltage bus apparatus is less than a second voltage threshold, wherein the first voltage threshold is greater than the second voltage threshold.

12. The method of claim 11, wherein the three-level voltage bus apparatus comprises:
a diode coupled between a common node of the first switch and the first capacitor, and a common node of the second capacitor and the second switch.

13. The method of claim 11, further comprising:
turning off the first switch and the second switch of the three-level voltage bus apparatus simultaneously when the voltage across the first voltage bus and the second voltage bus of the three-level voltage bus apparatus is greater than the first voltage threshold; and
turning on the first switch and the second switch of the three-level voltage bus apparatus simultaneously when the voltage across the first voltage bus and the second voltage bus of the three-level voltage bus apparatus is less than the second voltage threshold.

14. The method of claim 11, further comprising:
configuring the three-level voltage bus apparatus to operate at a dynamic transition mode when the voltage across the first voltage bus and the second voltage bus of the three-level voltage bus apparatus is between the second voltage threshold and the first voltage threshold.

15. The method of claim 14, wherein:
during the dynamic transition mode, the three-level voltage bus apparatus operates back and forth between a high input voltage mode and a low input voltage mode, and wherein:
in the high input voltage mode, both the first switch and the second switch are turned off; and
in the low input voltage mode, both the first switch and the second switch are turned on.

16. The method of claim 15, wherein:
a transition frequency between the high input voltage mode and the low input voltage mode is twice of a frequency of an input ac source coupled to the three-level voltage bus apparatus.

17. A system comprising:
a three-level voltage bus apparatus configured to be connected with a power source, wherein the three-level voltage bus apparatus comprises:
a first switch and a first capacitor connected in series between a first voltage bus and a second voltage bus;
a second capacitor and a second switch connected in series between the first voltage bus and the second voltage bus; and
a diode coupled between a common node of the first switch and the first capacitor, and a common node of the second capacitor and the second switch;
a first power converter having inputs connected to the first capacitor; and
a second power converter having inputs connected to the second capacitor, wherein outputs of the first power converter and outputs of the second power converter are connected in parallel.

18. The system of claim 17, wherein:
the three-level voltage bus apparatus is connected with the power source through a full-wave bridge rectifier, and wherein the power source is an ac power source.

19. The system of claim 17, wherein:
a voltage of the first voltage bus is greater than a voltage of the second voltage bus.

20. The system of claim 17, wherein:
the three-level voltage bus apparatus is directly connected with the power source, and wherein the power source is a dc power source.

* * * * *